United States Patent [19]

Llauge'

[11] 4,195,807

[45] Apr. 1, 1980

[54] RETAINING CLIP FOR ELONGATED MEMBERS

[75] Inventor: Joaquin R. Llauge', Barcelona, Spain

[73] Assignee: ITW Espana, S.a., Barcelona, Spain

[21] Appl. No.: 919,109

[22] Filed: Jun. 26, 1978

[30] Foreign Application Priority Data

Jul. 4, 1977 [ES] Spain .............................. 229.733[U]

[51] Int. Cl.² .............................................. F16L 3/10
[52] U.S. Cl. .................. 248/74 A; 24/73 AP
[58] Field of Search ................... 248/69, 73, 71, 74 A; 24/73 SA, 73 AP

[56] References Cited

U.S. PATENT DOCUMENTS

| | | | |
|---|---|---|---|
| 2,108,347 | 2/1938 | Quarnstrom | 24/73 SA |
| 2,948,940 | 8/1960 | Degener | 248/74 A X |
| 3,252,677 | 5/1966 | Raymond | 248/74 A X |
| 3,659,319 | 5/1972 | Erickson | 248/74 A X |
| 4,083,523 | 4/1978 | Fisher | 248/74 A |

Primary Examiner—Rodney H. Bonck
Attorney, Agent, or Firm—Jack R. Halvorsen; Robert W. Beart

[57] ABSTRACT

A one-piece plastic retaining clip for securing elongated members relative to a panel surface including a head, means for fastening the head relative to the panel surface and clip means extending from said head in a direction opposite from said fastening means. Said clip including two laterally disposed sections with the first section having a generally semi-circular or C-shaped configuration terminating at its free end in an inwardly directed flange or protuberance. The second section has its concavity facing the first section and terminates in an inwardly directed flap whose free end is generally hook-shaped whereby the elongated element is disposed within said hook-shaped portion of the flap and impinged upon by said flange in the free end of the first section to retain it in supportive relation relative to the panel.

7 Claims, 3 Drawing Figures

RETAINING CLIP FOR ELONGATED MEMBERS

The present invention refers to an improved fastening device. This device is specially designed to retain or guide elongated elements and can be applied to practically all the sectors of the industry, serving as a fastening member for any type of elongated element having a small diameter, such as for example electrical cables and the like.

The device is of a single piece construction, preferably of thermoplastic material, and has the capability of accepting different diameter elements that are to be retained. This capacity to receive elements having different diameters is due to the structural shape thereof as well as to the elastic nature of the material from which it is fabricated.

The fastening device contemplates means for securing it to a supporting surface and in this embodiment is provided with a head having a truncated sealing washer section from which there emerges a centrally disposed cylindrical rod or shank having an enlarged end for fastening to a complementary aperture in the supporting surface. This type of fastening can be changed for any other suitable fastening means.

Integral with the head is a clip body having two lateral sections, one of which is generally rigid and curved in a C-shape whose concavity faces the other section. This first lateral section terminates at its free end with a generally downwardly directed flange or protuberance extending toward said head. The second section also has a first portion in the form of a shallower C-shape, whose concavity faces the other concavity, and at its free end has a very sharp bend inwards toward the other concavity forming a resilient end flap which is generally housed in the concavity of the first section and which terminates in a pronounced curve directed outwardly in opposition to said flange or protuberance on said first section.

The sections of the clip body form an angular inlet on which the tube, bar, cable or any other element to be fixed initially rests. Pressure exerted on said element produces a relative separation of the mentioned sections of the clip body by movement of the element along the angled flap. The element to be retained is able to pass into the interior of the device where it fits into the terminal and curve of the second section with the flange or protuberance of the first section bearing on the opposite side of the centerline of said element, thereby permitting the closure of the clip sections once the element to be retained has been housed therebetween. Thus, gripping action assures retention of the element.

It can be seen from the aforegoing that the fastening device is highly economical since it is made in a single piece from thermoplastic material and it assures a positive fastening due to the elastic nature thereof. Furthermore, the mentioned fastening operation is extremely simple and rapid, since it is sufficient to face the element and the angle formed by the two laminar sections and subsequently press said element so that same reaches the interior of the device and is thus perfectly fastened.

To complement the description which will now be made and for a better understanding of the characteristics of the invention, a set of drawings is attached to this specification wherein, by way of illustration and not limitative, the following is represented:

Figure 1:
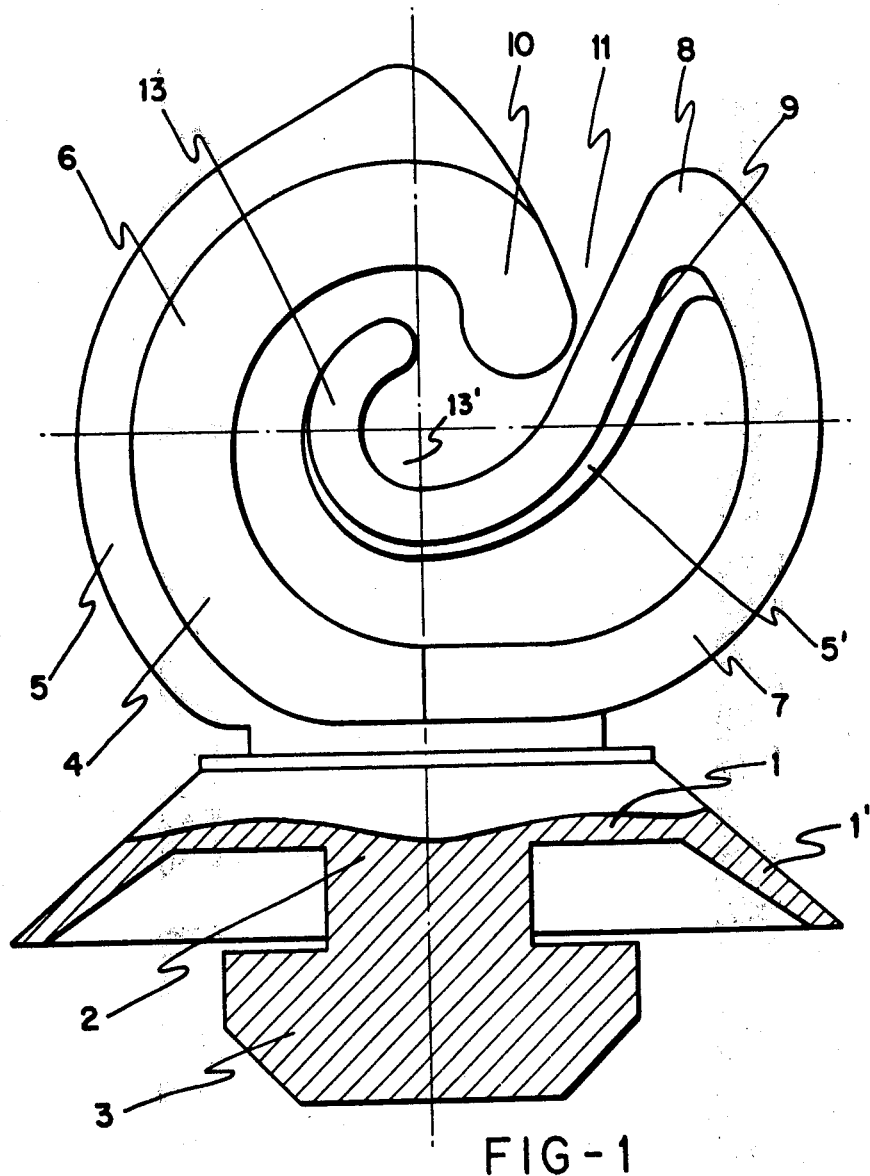
FIG. 1 illustrates an elevational view in partial section of the fastening device of this invention.
Figure 2:
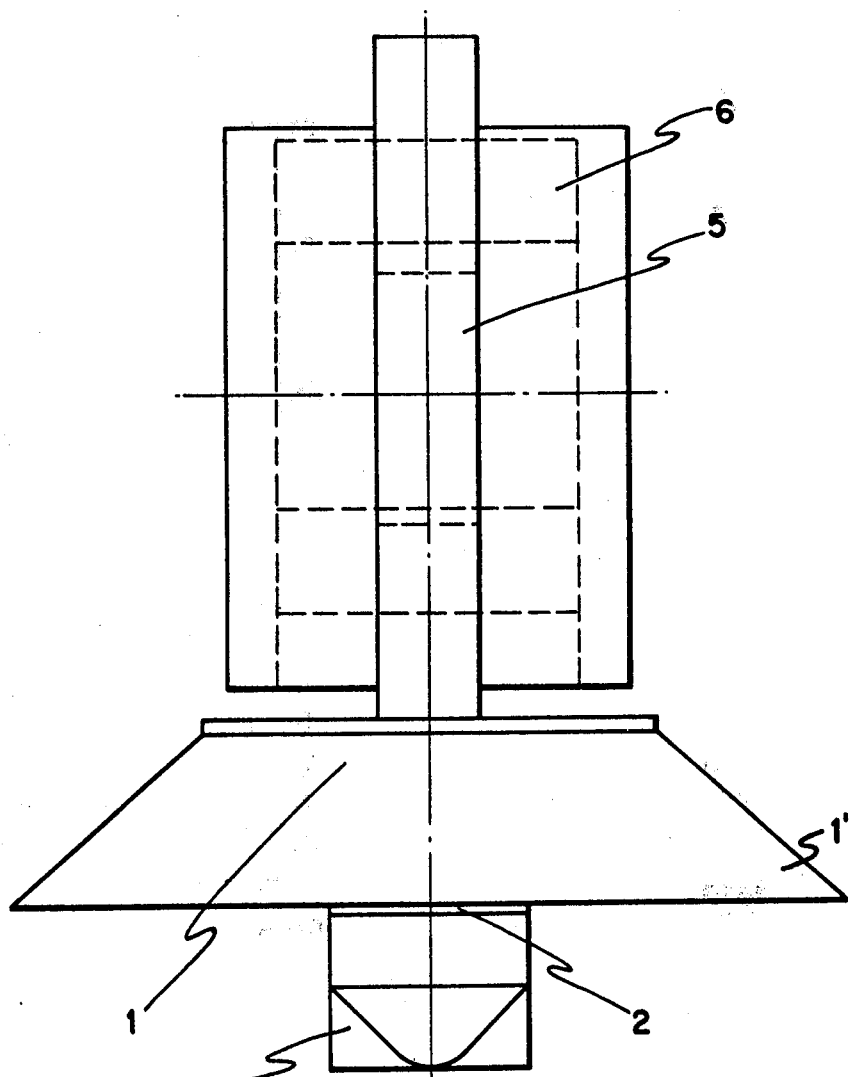
FIG. 2 is an elevational end view of the device shown in FIG. 1.

Referring now to the drawing, the one-piece thermoplastic fastening device includes a head 1 preferably including a truncated sealing washer 1. A cylindrical projection or shank 2 extends from head 1 and is provided with a fastening means 3 for retaining the device in a complementary apertured panel, not shown. Other suitable fastening means known in the art may also be utilized. Said head 1 opposite to the fastening means 3 includes an integral clip body 4 having two lateral sections, one of which sections 6 makes a path with an almost semi-circular or C-shaped profile which terminates at its free end in a protuberance or flange 10 extending downwardly towards the head 1 and with the concavity of the first section 6 facing the other opposed section 7. This first section 6 is substantially rigid and may include a heavy body section or a reinforcing rib 5. The second section 7 is resilient and has a first portion with a partial semi-circular or shallow C-shaped profile whose concavity faces the opposing concavity and at its free end has a sharp bend 8 which extends inwardly as an end flap 9 terminating in a reversely curved end 13 whose concavity 13' faces in spaced relation the free end protuberance or flange 10 of the first section 6. A tapered reinforcing rib 5' extends along flap 9 from its juncture at bend 8 to the curved end 13 where it blends into that surface and thereby provides a certain stiffness to flap 9 while permitting curved end 13 to resiliently open to embrace elements 12 having a larger diameter than the radius of curvature of concavity 13'.

Figure 3:
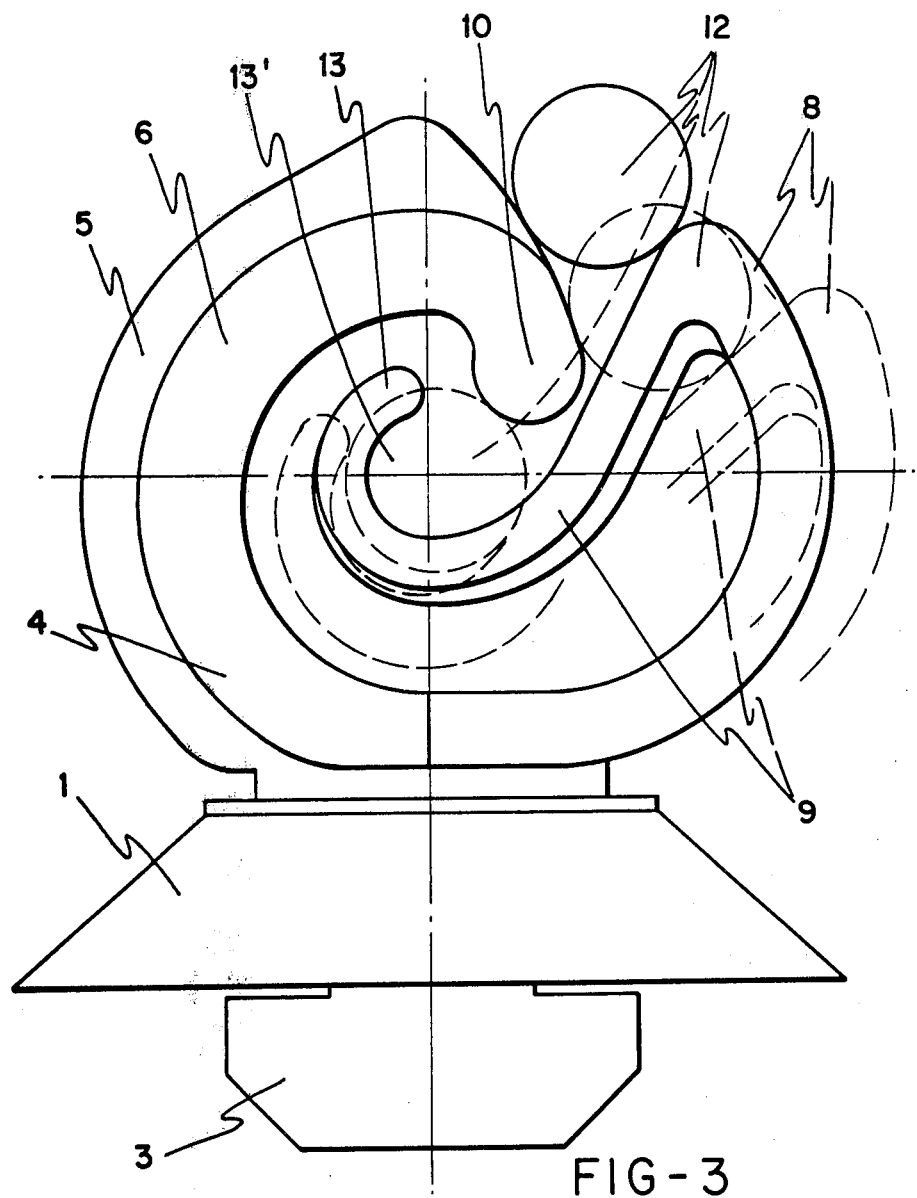
FIG. 3 is an elevational view similar to that of FIG. 1 but with a cylindrical element conveniently positioned in a pre-introduction position, and likewise representing in phantom the position of said element and of the device during insertion when pressure is exerted on the mentioned element to effect fastening and also in phantom the finally installed position.

As can be seen from FIGS. 1 and 3, between the free end 10 of the first section 6 and the zone adjacent to the bend 8 of the end flap 9 of the section 7, there is formed a sharp angled V-shaped throat 11 into which the element 12 to be fastened is introduced. This initial positioning of element 12 corresponding to the pre-introduction and which is represented with a continuous line in FIG. 3 changes as the element 12 is pressed in the direction also represented in FIG. 3 but with a discontinuous phantom line so that between the flap 9 and the end 10 of the section 6 of the clip body there is established an inlet whose diameter is equal to that of the element 12. At that moment element 12 can reach the inner cavity 13' of the fastening device, producing simultaneously the opening of cavity 13' to accept element 12 and the closure of throat 11 and the impingement of the protuberance or flange 10 at the end of the section 6 on the opposite side of element 12, as also shown in phantom in FIG. 3.

Thus, a slight pressure on element 12 is sufficient for it to reach its final mounted position in curved end cavity 13' in the fastening device, while its involuntary withdrawal is practically impossible inasmuch as once the element 12 is suitably positioned in the mentioned cavity 13', the end 10 of the section 6 prevents accidental removal.

It can be seen from the drawings that in order to withdraw the mentioned element 12 it is necessary to combine two forces: one referring to the extraction itself made on the element 12; and the other which should displace the flap 9 outwards so that the cavity 13 is moved sideways and its center conveniently faces the inlet throat 11. It is practically impossible for these two perpendicular forces to appear accidentally and simultaneously; thus, the safety of the fastening device is optimum.

This device can be injection molded using known techniques and materials such as nylon. Other forms of means for fastening to a supporting surface will be apparent to those skilled in the art.

I claim:

1. A one-piece plastic clip for fastening an elongated element to a supporting surface including a head, means for fastening said head to the supporting surface, and integral clip means extending from said head in a direction opposite to said fastening means, said clip means including two lateral sections, the first section having a substantially rigid generally C-shaped configuration whose concavity faces the second section, said second section being resilient and having a shallower C-shaped configuration whose concavity faces said first section, the free end of said second section being acutely bent back upon itself to form a resilient flap extending into the interior of said concavities and forming a restrictive throat between said flap and the free end of said first section, the free end of said flap being reversely bent into a resilient hook-shaped configuration having its concavity facing in spaced opposed relation to detent means carried by the free end of said first section, whereby introduction of an elongated element into said restricted throat causes lateral deflection of said flap and said second section until said element is embraceably accepted within the adjustable concavity of said free end hook of said flap and impingingly restrained by the free end of said first section.

2. A clip of the type claimed in claim 1 wherein said detent means carried by the free end of said first section includes a protuberance extending into the concavity formed by said resilient hook shaped configuration at the free end of said flap.

3. A clip of the type claimed in claim 2 wherein said protuberance is a flange extending throughout the width of said first section and providing stability to said elongated element by bearing in generally line contact therewith.

4. A clip of the type claimed in claim 3 wherein said first section includes an exteriorly disposed reinforcing rib.

5. A clip of the type claimed in claim 4 wherein said flap includes a tapered reinforcing rib with the rib blending into said hook-shaped configuration at the free end of the flap to thereby provide the greatest resilience in the hook-shaped free end to permit adjustable gripping of the elongated element in opposition to said flange carried by the free end of said first section.

6. A clip of the type claimed in claim 5 wherein said flap is generally linear from its juncture at the acute bend with said second section to its free end which is curved into said hook-shaped configuration, said flap forming a V-shaped throat with the flanged free end of said first section for acceptance of said elongated element.

7. A clip of the type claimed in claim 1 wherein said head includes a frusto-conical sealing washer extending in the direction of said fastening means to seal an aperture in said supporting surface designed to accept said fastening means.

* * * * *